United States Patent
Furuta

(10) Patent No.: US 9,106,846 B2
(45) Date of Patent: *Aug. 11, 2015

(54) COMMUNICATION SYSTEMS, COMMUNICATION APPARATUS, AND IMAGE PROCESSOR

(75) Inventor: Taku Furuta, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 223 days.

This patent is subject to a terminal disclaimer.

(21) Appl. No.: 13/348,519

(22) Filed: Jan. 11, 2012

(65) Prior Publication Data

US 2012/0176646 A1     Jul. 12, 2012

(30) Foreign Application Priority Data

Jan. 11, 2011  (JP) .................................. 2011-003351

(51) Int. Cl.
*G06F 3/12* (2006.01)
*H04N 1/32* (2006.01)
*H04N 1/00* (2006.01)

(52) U.S. Cl.
CPC ........ *H04N 1/32128* (2013.01); *H04N 1/00281* (2013.01); *H04N 2201/001* (2013.01); *H04N 2201/0094* (2013.01); *H04N 2201/3205* (2013.01); *H04N 2201/3214* (2013.01); *H04N 2201/3215* (2013.01); *H04N 2201/3232* (2013.01); *H04N 2201/3278* (2013.01)

(58) Field of Classification Search
None
See application file for complete search history.

(56) References Cited

U.S. PATENT DOCUMENTS

| | | | |
|---|---|---|---|
| 2002/0191228 A1 | 12/2002 | Ishibashi | |
| 2004/0024829 A1* | 2/2004 | Tanimoto | 709/206 |
| 2006/0087690 A1* | 4/2006 | Park et al. | 358/1.15 |
| 2007/0035781 A1* | 2/2007 | Maruyama | 358/405 |
| 2008/0151316 A1* | 6/2008 | Yoshida | 358/402 |
| 2008/0259385 A1* | 10/2008 | Uruma | 358/1.15 |

(Continued)

FOREIGN PATENT DOCUMENTS

| | | |
|---|---|---|
| JP | S62-230153 A | 10/1987 |
| JP | S63-043464 A | 2/1988 |

(Continued)

OTHER PUBLICATIONS

Japan Patent Office, Notice of Reasons for Rejection for Japanese Patent Application No. 2011-003351 (counterpart Japanese patent application), mailed Dec. 25, 2012.

*Primary Examiner* — Fred Guillermety
*Assistant Examiner* — Henok A Shiferaw
(74) *Attorney, Agent, or Firm* — Baker Botts L.L.P.

(57) ABSTRACT

A communication system including a communication apparatus that communicates with a destination apparatus, and an image processor that connects to the communication apparatus. The image processor includes a supplying unit that supplies image data to the communication apparatus, and a notifying unit that transmits first additional information to the communication apparatus. The communication apparatus includes a memory that stores second additional information, a information generator that generates third additional information based on the second additional information stored in the memory and the first additional information received from the image processor, and a transmitter that adds the third additional information generated by the information generator to the image data supplied from the image processor and transmits the image data including the third additional information to the destination apparatus.

22 Claims, 7 Drawing Sheets

(56) References Cited

U.S. PATENT DOCUMENTS

| | | | |
|---|---|---|---|
| 2009/0313240 A1* | 12/2009 | Gile et al. | 707/5 |
| 2010/0245904 A1* | 9/2010 | Nishiyama et al. | 358/1.15 |
| 2011/0128962 A1* | 6/2011 | Hunkeler et al. | 370/393 |
| 2012/0200876 A1 | 8/2012 | Furuta | |

FOREIGN PATENT DOCUMENTS

| | | |
|---|---|---|
| JP | S63-258155 A | 10/1988 |
| JP | H04-074055 A | 3/1992 |
| JP | H04-107061 A | 4/1992 |
| JP | H05-276294 A | 10/1993 |
| JP | H06-030163 A | 2/1994 |
| JP | H09-093373 A | 4/1997 |
| JP | H09-261377 A | 10/1997 |
| JP | H11-205564 A | 7/1999 |
| JP | H11-252304 A | 9/1999 |
| JP | 2001-045190 A | 2/2001 |
| JP | 2002-094728 A | 3/2002 |

* cited by examiner

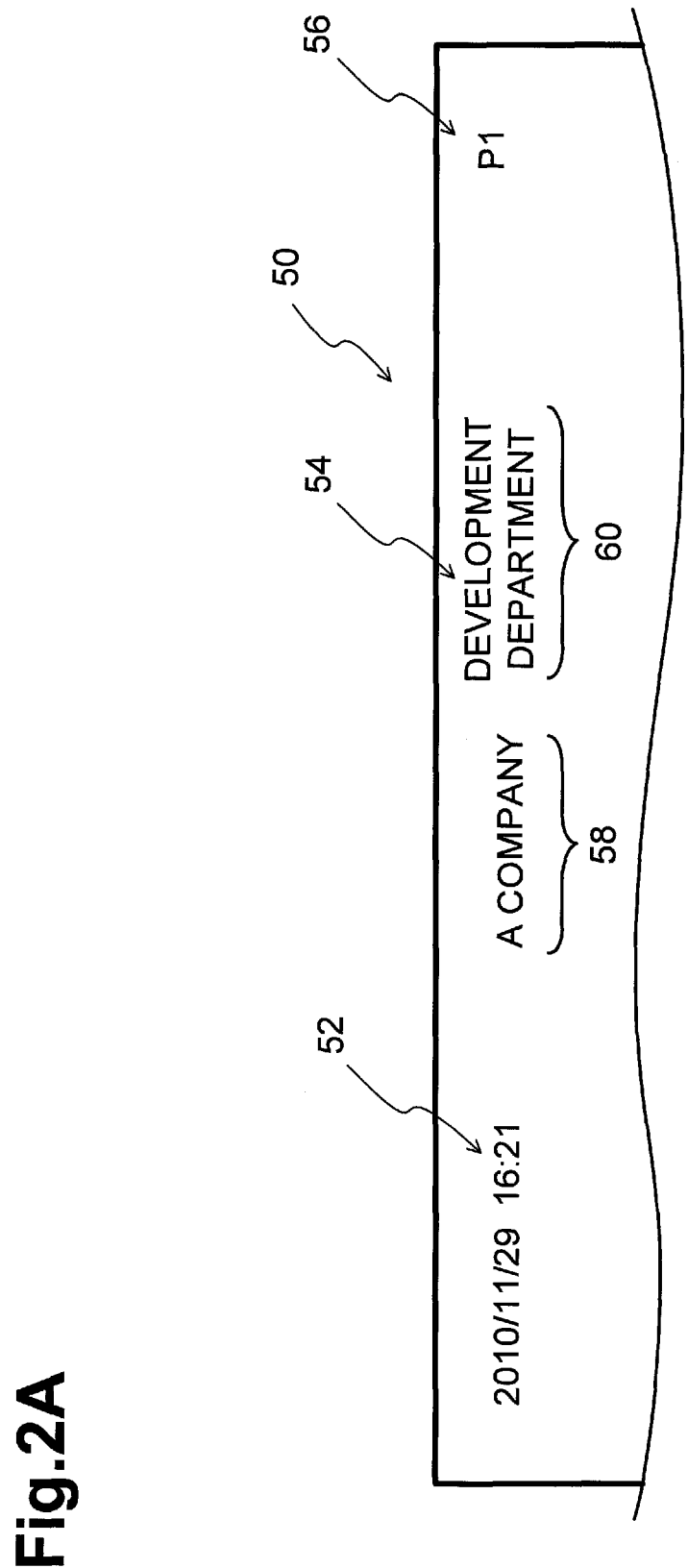

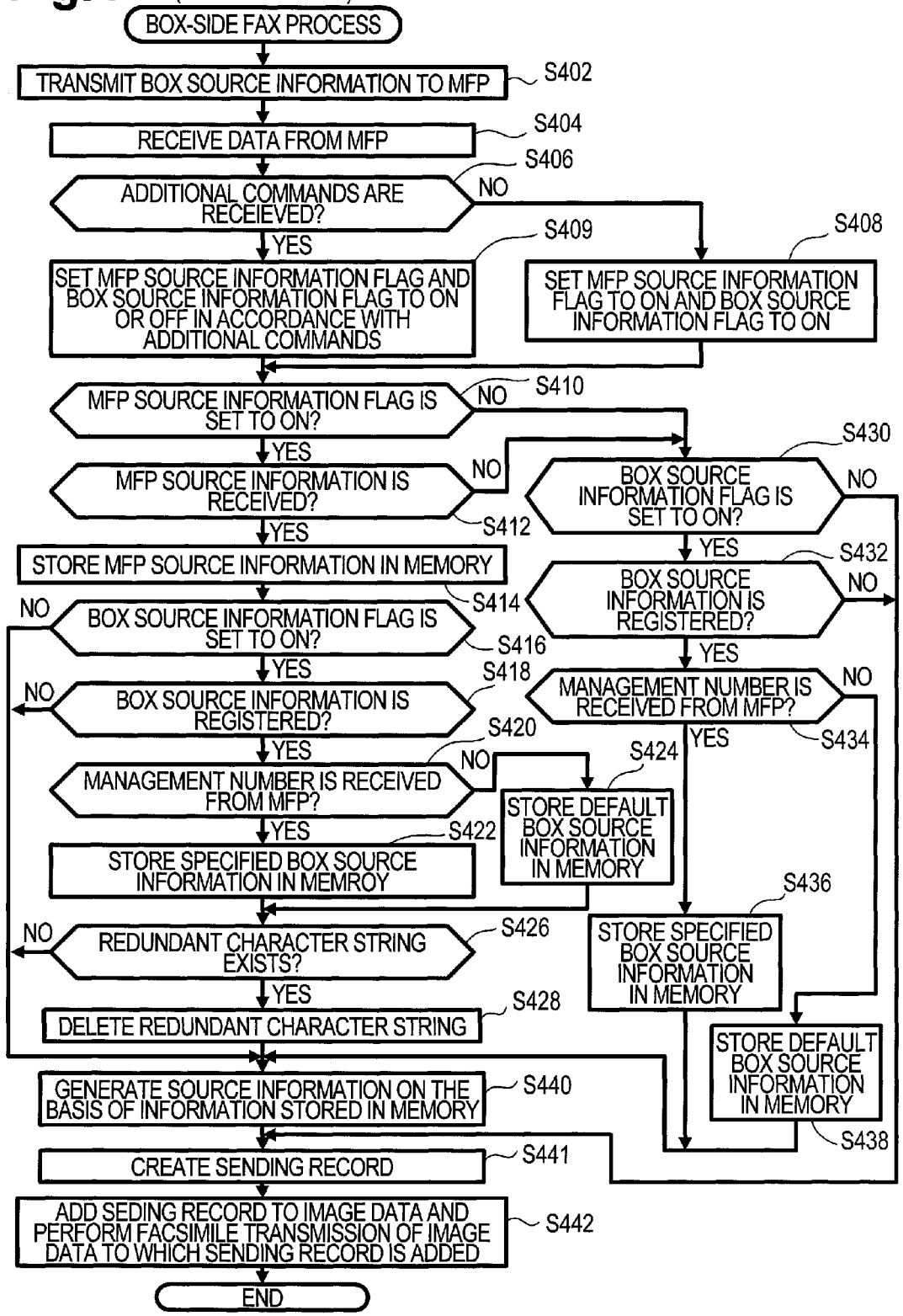

COMMUNICATION SYSTEMS, COMMUNICATION APPARATUS, AND IMAGE PROCESSOR

CROSS REFERENCE TO RELATED APPLICATION

This application claims priority from Japanese Patent Application No. 2011-003351, filed on Jan. 11, 2011, the disclosure of which is incorporated herein by reference.

BACKGROUND OF THE DISCLOSURE

1. Field of the Invention

The invention relates generally to communication systems, communication apparatus, and image processor.

2. Description of Related Art

In a known method, as described in Japanese Unexamined Patent Application Publication No. H09-261377, header information including a sender name may be added to an upper part of each page of a transmission document. In a known client-server system, as described in Japanese Unexamined Patent Application Publication No. H11-252304, a data processing apparatus of a client may perform facsimile communication via a facsimile server. In the known method, source information registered in the facsimile server may be added to facsimile data, and the facsimile data, to which the source information is added, may be transmitted. In known methods and systems, users may be required to register and to update the source information, which is tedious to the users.

SUMMARY OF THE DISCLOSURE

According to an embodiment of the invention, communication systems, communication apparatus, and image processor may be configured to add appropriate additional information to image data and to transmit the image data, to which the appropriate additional information is added, to a destination apparatus.

According to an embodiment of the present invention, a communication system comprising: a communication apparatus configured to communicate with a destination apparatus; and an image processor configured to connect to the communication apparatus, wherein the image processor comprises: a supplying unit configured to supply image data to the communication apparatus; and a notifying unit configured to transmit first additional information to the communication apparatus, and wherein the communication apparatus comprises: a memory configured to store second additional information; a information generator configured to generate third additional information based on the second additional information stored in the memory and the first additional information received from the image processor; and a transmitter configured to add the third additional information generated by the information generator to the image data supplied from the image processor and transmit the image data including the third additional information to the destination apparatus.

According to another embodiment of the present invention, a communication apparatus configured to communicate with a destination apparatus, the communication apparatus comprising: an image data acquiring unit configured to acquire image data supplied from an image processor; an additional information acquiring unit configured to acquire first additional information from the image processor; a memory configured to store second additional information; a information generator configured to generate third additional information based on the second additional information stored in the memory and the first additional information acquired by the additional information acquiring unit; and a transmitter configured to add the third additional information generated by the information generator to the image data acquired by the image data acquiring unit and transmit the image data including the third additional information to the destination apparatus.

According to still another embodiment of the invention, an image processor configured to connect to a communication apparatus that communicates with a destination apparatus, the image processor comprising: a supplying unit configured to supply image data to the communication apparatus; a notifying unit configured to transmit first additional information to the communication apparatus; and a requesting unit configured to request the communication apparatus to: add third additional information generated based on the first additional information transmitted from the image processor and second additional information stored in a memory of the communication apparatus to the image data, and transmit the image data including the third additional information from the communication apparatus to the destination apparatus.

Other objects, features, and advantages of an embodiment of the invention will be apparent to persons of ordinary skill in the art from the following description of an embodiment with reference to the accompanying drawings.

BRIEF DESCRIPTION OF THE DRAWINGS

For a more complete understanding of the present invention, needs satisfied thereby, and the objects, features, and advantages thereof, reference now is made to the following descriptions taken in connection with the accompanying drawings.

FIG. 2A depicts an example of a sending record to be added to facsimile data according to an embodiment of the invention.

FIG. 4 is a flow chart depicting a BOX-side FAX process executed by a CPU in a BOX according to an embodiment of the invention.

DETAILED DESCRIPTION OF EMBODIMENTS OF THE INVENTION

For a more complete understanding of the present invention, needs satisfied thereby, and the objects, features, and advantages thereof, reference now is made to the following description taken in connection with the accompanying drawings.

Figure 1:
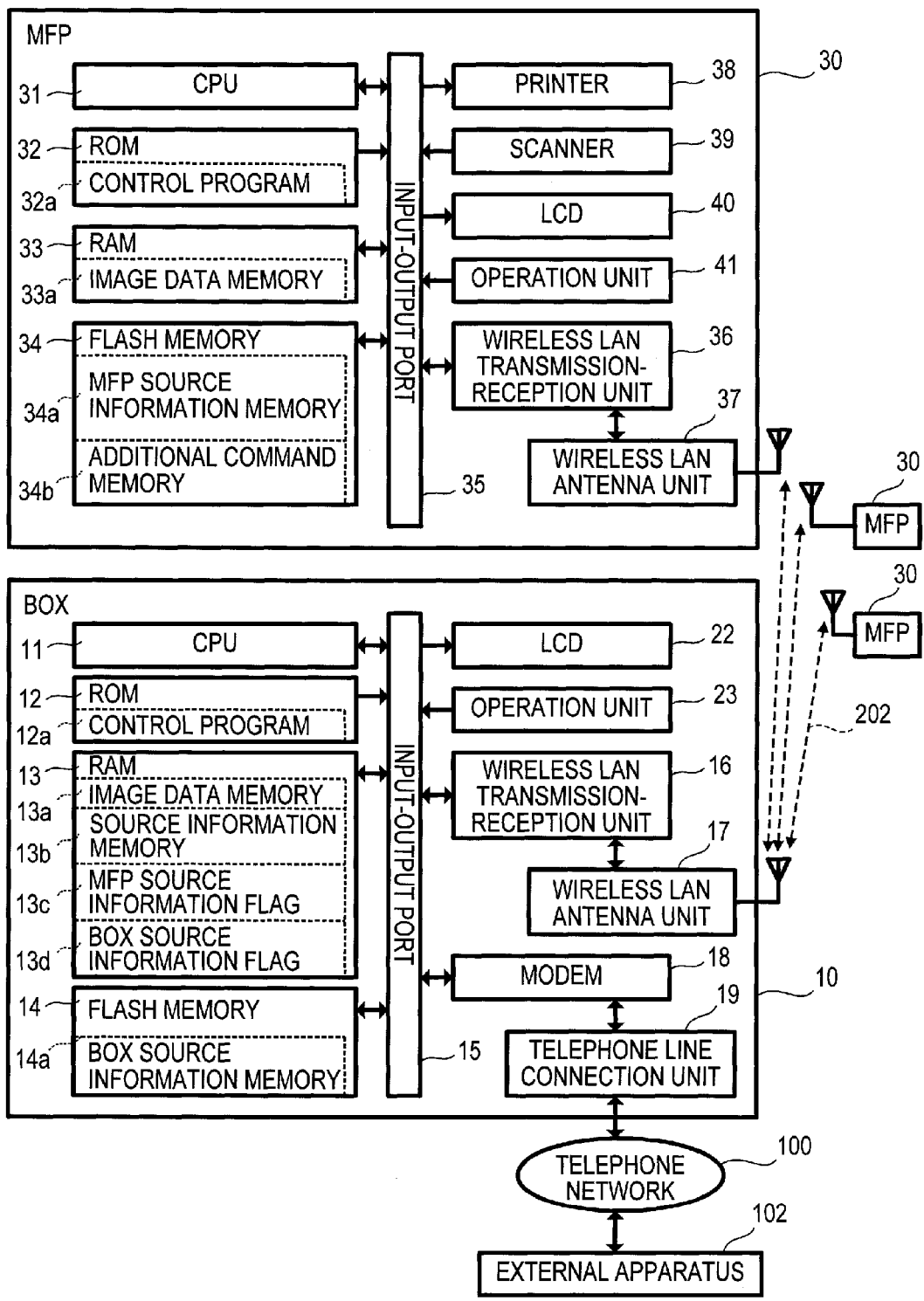
FIG. 1 is a block diagram depicting an electrical configuration of a communication system according to an embodiment of the invention.

Embodiments of the invention will herein be described with reference to the attached drawings. FIG. 1 is a block diagram depicting an electrical configuration of a communication system 1 including a communication apparatus, e.g., a line control apparatus (hereinafter referred to as "BOX") 10, and an image processor, e.g., a multifunctional peripheral ("MFP") 30. Communication system 1 may be configured to add appropriate source information to image data and transmit the image data, to which the source information is added, to a destination apparatus.

BOX 10 may perform communication with a destination apparatus, e.g., an external apparatus 102, over a telephone network 100. BOX 10 may comprise a central processing unit ("CPU") 11, a read only memory ("ROM") 12, a random access memory ("RAM") 13, a flash memory 14, a wireless local area network ("LAN") transmission-reception unit 16, a wireless LAN antenna unit 17, a modem 18, a telephone line connection unit 19, a liquid crystal display ("LCD") 22, and an operation unit 23. These components may be connected to each other, such that they communicate via an input-output port 15.

CPU 11 may control the components connected to input-output port 15 in accordance with fixed values and/or programs stored in ROM 12, or various signals transmitted and received by wireless communication 202. ROM 12 may be a non-rewritable memory and may store a control program 12a for executing a process, e.g., a process depicted in FIG. 4. RAM 13 may be a rewritable volatile memory and may comprise an image data memory 13a, a source information memory 13b, an MFP source information flag 13c, and a BOX source information flag 13d.

Image data memory 13a may store image data supplied from MFP 30. Source information memory 13b may store source information to be added to the header of the image data, which may be stored in image data memory 13a. MFP source information flag 13c may indicate whether MFP source information received from MFP 30 to BOX 10 is included in the source information added to the header of the image data. BOX source information flag 13d may indicate whether BOX source information registered, e.g., stored, in BOX 10 is included in the source information added to the header of the image data.

Flash memory 14 may be a rewritable non-volatile memory and may include a BOX source information memory 14a. BOX source information set by the user may be registered in BOX source information memory 14a.

Wireless LAN transmission-reception unit 16 may be a circuit that performs the wireless communication 202 over a wireless LAN conforming to Institute of Electrical and Electronic Engineers (IEEE) 802.11b/g. BOX 10 may communicate with MFP 30 by wireless LAN antenna unit 17 and wireless LAN transmission-reception unit 16. Modem 18 may modulate image data for facsimile transmission into a signal compatible for transmission to telephone network 100. Telephone line connection unit 19 may transmit the modulated image data to telephone network 100. Telephone line connection unit 19 may receive a signal from telephone network 100. Modem 18 may demodulate the signal received from telephone network 100 into image data. Telephone line connection unit 19 may connect telephone network 100 with BOX 10. Telephone line connection unit 19 may selectively connect and disconnect the telephone line in response to an instruction from modem 18 that controls the connection status with external apparatus 102. LCD 22 may display messages for guiding a method of operating BOX 10. Operation unit 23 may comprise keys configured to receive setting values and instructions for operating BOX 10.

BOX 10 may transmit and receive the image data via telephone network 100 in G3FAX standard. In another embodiment, BOX 10 may transmit and receive the image data according to another standard, e.g., G4FAX, IPFAX, or InternetFAX.

MFP 30 may perform a plurality of functions, e.g., one or more of a printer function, a scanner function, and a copy function. MFP 30 may comprise a CPU 31, a ROM 32, a RAM 33, a flash memory 34, a wireless LAN transmission-reception unit 36, a wireless LAN antenna unit 37, a printer 38, a scanner 39, an LCD 40, and an operation unit 41. These components may be connected to each other and may communicate with each other via an input-output port 35.

CPU 31 may control the components connected to input-output port 35 in accordance with fixed values and/or programs stored in ROM 32 or various signals transmitted and received by wireless communication 202. ROM 32 may be a non-rewritable memory and may store a control program 32a for executing a process, e.g., a process depicted in FIG. 3. RAM 33 may be a rewritable volatile memory and may include an image data memory 33a. Image data generated by scanner 39 may be stored in image data memory 33a. MFP 30 may supply the image data stored in image data memory 33a to BOX 10.

Flash memory 34 may be a rewritable non-volatile memory and may include a MFP source information memory 34a and an additional command memory 34b. MFP source information set by the user of MFP 30 may be stored in MFP source information memory 34a.

Additional command memory 34b may store additional commands indicating settings selected by the user. The additional commands may include a first additional command indicating whether the MFP source information is included in the header of the image data and a second additional command indicating whether the BOX source information is included in the header of the image data. The additional commands may be set by the user with operation unit 41 in MFP 30.

Wireless LAN transmission-reception unit 36 may be a circuit configured in the same manner as in wireless LAN transmission-reception unit 16 in BOX 10 and establish wireless communication 202 with BOX 10. Printer 38 may form an image on a sheet of paper. Scanner 39 may scan a document to generate image data. LCD 40 may display, for example, operational processes of MFP 30, a variety of information, and messages. Operation unit 41 may include keys used to input setting values and instructions into MFP 30. Even though one multiple MFP 30 is described herein, a plurality of MFP's 30 may be connected to BOX 10 in the communication system 1.

FIG. 2A depicts an example of a sending record 50 to be added to the header of image data for facsimile transmission. The sending record 50 may comprise sending date and time information 52, source information 54, and page information 56. When the image data is received and printed out at external apparatus 102, a recipient may view the sending information of the sending record 50 included in the header of the image data.

The sending date and time information 52 may indicate a date and time when the facsimile transmission is performed and may be added to the header of the image data in BOX 10. The source information 54 may indicate the source of the image data and may include second additional information, e.g., BOX source information 58, and first additional information, e.g., MFP source information 60.

The page information 56 may indicate the page number of the image data to be facsimile transmitted. The sending record 50 may comprise other information, such as identification information, e.g., facsimile numbers, of communication system 1.

Figure 2B:
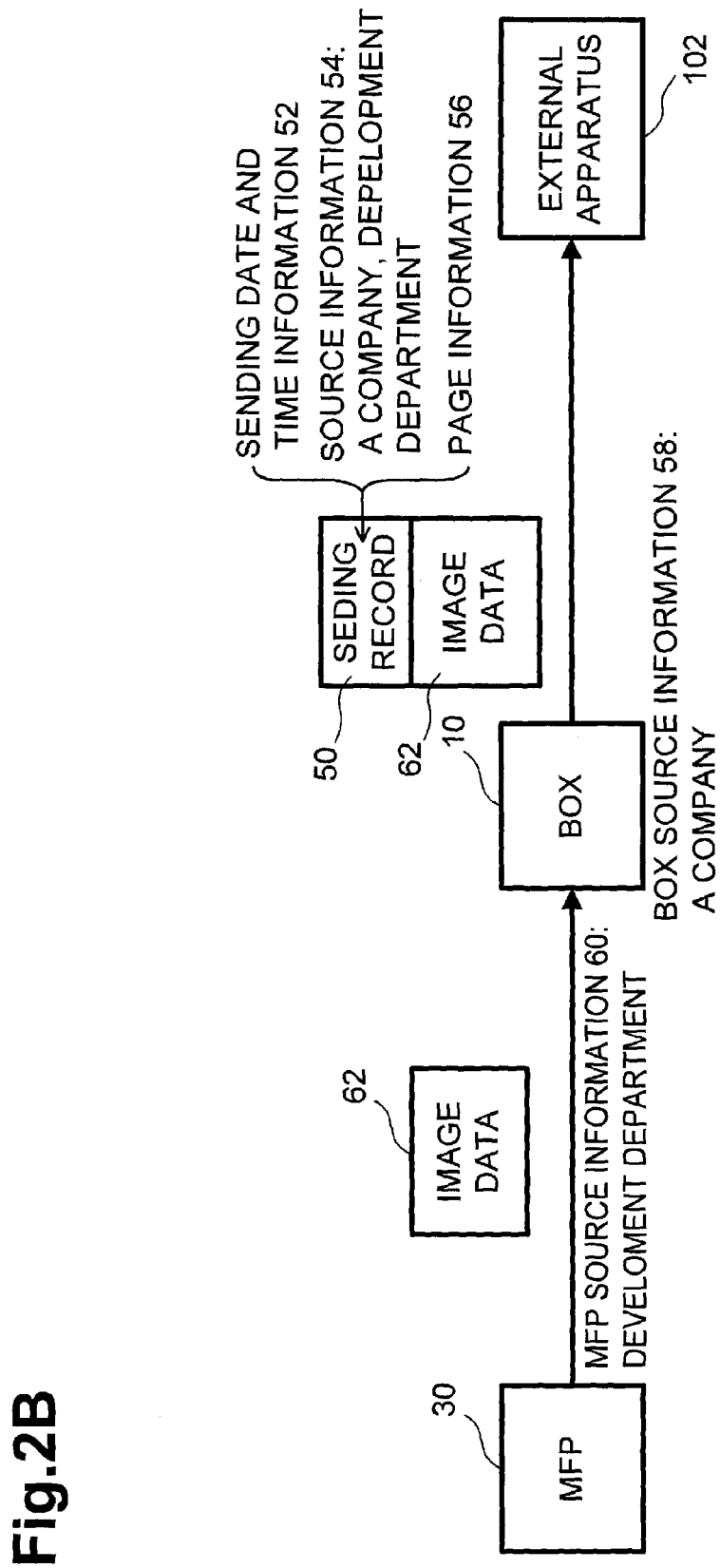
FIG. 2B depicts a process of generating source information according to an embodiment of the invention.

FIG. 2B depicts the process of generating the source information 54. Image data 62 for facsimile transmission may be supplied from MFP 30 to BOX 10. MFP 30 may notify BOX 10 of the MFP source information 60 preset by the user in MFP 30. In another embodiment, the BOX source information 58 may be registered at BOX 10. BOX 10 may generate the source information 54 based on the BOX source information 58 registered at BOX 10 or the MFP source information 60 received from MFP 30. BOX 10 then may generate the sending record 50 comprising the sending date and time information 52, the source information 54, and the page information 56, and may add the sending record 50 to the header of the image data. BOX 10 may transmit the image data 62 including the sending record 50 to external apparatus 102, e.g., a destination apparatus.

Accordingly, the appropriate source information 54 may be added to the image data 62 for transmission to the destination apparatus without user input. When a plurality of MFP's 30 are connected to one BOX 10, a common part, e.g., company name, in the source information 54 may be registered in advance in BOX 10 as the BOX source information 58 and a part, e.g., department name, for each MFP 30 may be set in MFP 30 as the MFP source information 60. Thus, the source information 54, e.g., company name plus department name, may indicate which MFP 30 in communication system 1 the image data 62 is sent from based on the BOX source information 58 and the MFP source information 60.

For example, when adding an MFP 30 to the communication system 1, a user may set the MFP source information 60 in MFP 30. The common part, e.g., company name, in the source information 54 may not be registered in the newly added MFP 30. When the common part, e.g., company name, in the source information 54 is changed, the user may change the BOX source information 58 in BOX 10 without changing the settings for each of the respective MFP's 30. Accordingly, the amount of work for managing communication system 1 is reduced.

For example, when the MFP source information 60 is frequently changed, e.g., two departments share one MFP 30 in a company, the user may change the setting in the MFP source information 60, without changing the BOX source information 58, which is the common part. Accordingly, the source information 54 may be generated and transmitted to the destination apparatus without additional work by the user.

The BOX source information 58 may be listed before the MFP source information 60 in the sending record 50. Accordingly, information indicating a higher hierarchy in the source information 54, e.g., company name, may be set as the BOX source information 58 and information indicating a lower hierarchy in the source information 54, e.g., department name, may be set as the MFP source information 60, such that the source information 54, e.g., "A company, development department," in which the information indicating the lower hierarchy is arranged next to the information indicating the higher hierarchy, may be generated.

For example, when one BOX 10 is installed in a home and each member of the family is associated with the MFP 30, information indicating a higher hierarchy in the source information 54, e.g., family name, may be set as the BOX source information 58, and information indicating a lower hierarchy in the source information 54, e.g., personal name, may be set as the MFP source information 60, such that the source information 54, in which the information about the personal name is arranged next to the information about the family name, may be generated.

In the source information 54, the BOX source information 58 and the MFP source information 60 may be successively arranged, without other information arranged between the BOX source information 58 and the MFP source information 60. Thus, the BOX source information 58 and the MFP source information 60 may be displayed as integrated information.

Figure 3:
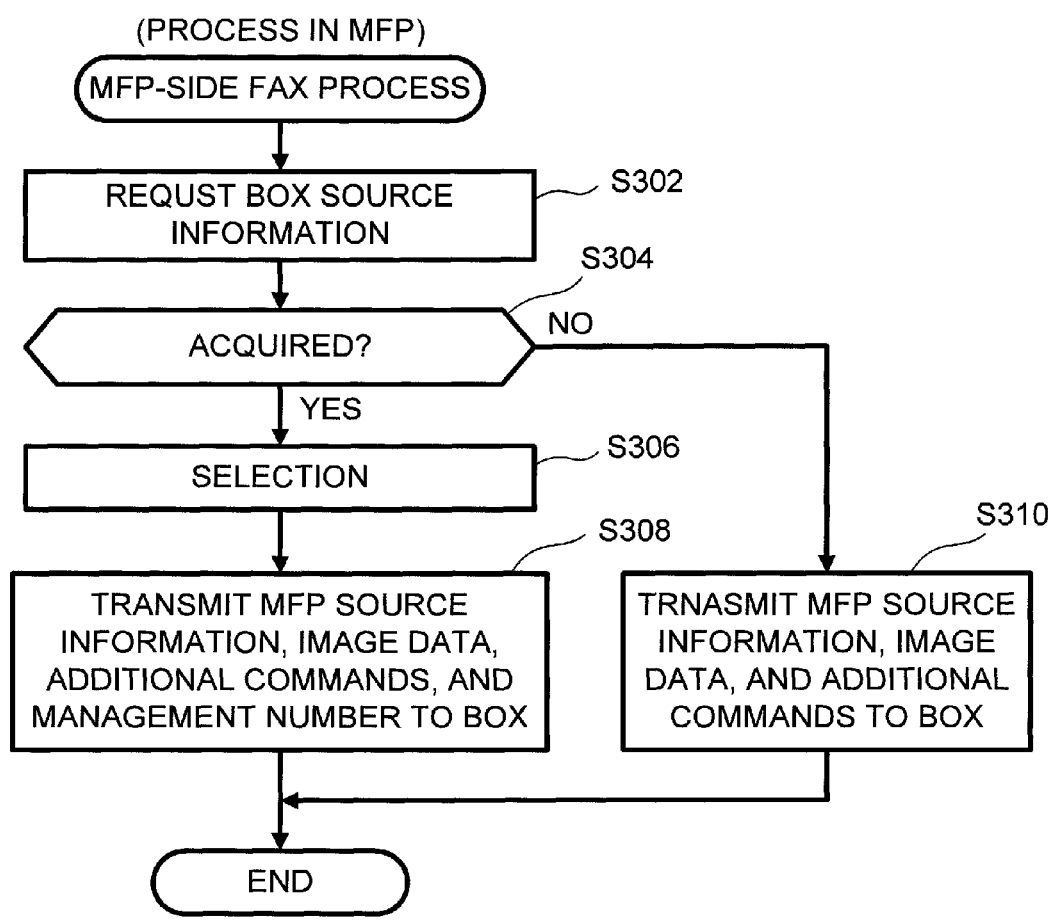
FIG. 3 is a flow chart depicting an MFP-side FAX process executed by a CPU in an MFP according to an embodiment of the invention.

FIG. 3 is a flow chart depicting an MFP-side facsimile (FAX) process executed by CPU 31 in MFP 30. In the MFP-side FAX process, the MFP 30 may transmit the MFP source information 60 and the image data 62 to BOX 10 and may request BOX 10 to generate the source information 54 and to transmit the image data 62 including the source information 54 to the destination apparatus. The image data 62 to be subjected to the facsimile transmission may be generated by the scanner 39 in MFP 30 and may be stored in the image data memory 33a before beginning the FMP-side FAX process. MFP 30 may notify BOX 10 of a facsimile number identifying the destination apparatus of the facsimile transmission.

Referring to FIG. 3, in Step S302, CPU 31 may request the BOX source information 58 from BOX 10. In Step S304, CPU 31 may determine whether the BOX source information 58 has been acquired. If the BOX source information 58 has been acquired, e.g., YES at Step S304; in S306, CPU 31 may display the acquired BOX source information 58 in LCD 40 and may prompt the user to select one piece of the BOX source information 58. Multiple kinds of BOX source information 58 may have been registered in BOX 10 and specific information for identification, e.g., management number, may be associated with each kind of BOX source information 58.

In Step S308, CPU 31 may transmit the MFP source information 60 set in MFP source information memory 34a, the image data 62 stored in image data memory 33a, the additional commands stored in additional command memory 34b, and the management number corresponding to the BOX source information 58 selected in Step S306 to BOX 10.

The additional commands may include the first additional command and the second additional command. The first additional command may selectively be set to ON or OFF to indicate whether the MFP source information 60 is included in the source information 54. The second additional command may selectively be set to ON or OFF to indicate whether the BOX source information 58 is to be included in the source information 54. The user of MFP 30 may set the first additional command to OFF and the second additional command to ON to instruct BOX 10 to include only the BOX source information 58, e.g., company name, in the source information 54. Similarly, the user of MFP 30 may set the first additional command to ON and the second additional command to OFF to instruct BOX 10 to include only MFP source information 60, e.g., the name of a person, in the source information 54.

At Step S310, if the BOX source information 58 has not been acquired, e.g., NO at Step S304, CPU 31 may transmit the MFP source information 60 stored in MFP source information memory 34a, the image data 62 stored in image data memory 33a, and the additional commands stored in additional command memory 34b to BOX 10.

FIG. 4 is a flow chart depicting a BOX-side FAX process executed by CPU 11 in BOX 10. In the BOX-side FAX process, the sending record 50 may be added to the image data 62 received from MFP 30 and the image data 62 to which the sending record 50 is added may be facsimile transmitted to the external apparatus 102. The BOX-side FAX process may begin in response to BOX 10 receiving a request for the BOX source information 58 from MFP 30.

Referring to FIG. 4, in Step S402, CPU 11 may transmit the BOX source information 58 stored in BOX source information memory 14a to MFP 30. In Step S404, CPU 11 may receive data transmitted from MFP 30. The data received in Step S404 may include the MFP source information 60, the image data 62, and the additional commands. If selection of the BOX source information 58 is performed in MFP 30, the data received in S404 also may comprise the management number.

In Step S406, CPU 11 may determine whether the additional commands are received. If no additional command is received, e.g., NO at Step S406, CPU 11 may set MFP source information flag 13c and BOX source information flag 13d to ON at Step S408.

If the additional commands are received, e.g., YES at Step S406, CPU 11 may set the status of the first additional command included in the additional commands in MFP source information flag 13c and the status of the second additional command included in the additional commands in BOX source information flag 13d at Step S409.

In S410, CPU 11 may determine whether the MFP source information flag 13c is set to ON. If MFP source information flag 13c is set to ON, e.g., YES at Step S410, CPU 11 may determine whether the MFP source information 60 is received from MFP 30 at Step S412. If the determination at Step S412 is affirmative, e.g., YES at Step S412, CPU 11 may store the received MFP source information 60 in source information memory 13b at Step S414.

In Step S416, CPU 11 may determine whether BOX source information flag 13d is set to ON. If BOX source information flag 13d is set to ON, e.g., YES at Step S416, CPU 11 may determine whether the BOX source information 58 is registered in BOX source information memory 14a at Step S418. If the BOX source information 58 is registered, e.g., YES at Step S418, CPU 11 may determine whether the management number specifying the BOX source information 58 is received from MFP 30 at Step S420.

If the determination in Step S420 is affirmative, e.g., YES at Step S420, CPU 11 may store the BOX source information 58 specified by the management number, e.g., the BOX source information 58 selected by the user of MFP 30, in source information memory 13 at Step S422, If the management number indicating the BOX source information 58 selected by the user of MFP 30 is not provided to BOX 10, e.g., NO at Step S420, CPU 11 may store the BOX source information 58 selected in advance as the default BOX source information 58 in source information memory 13b at Step S424. When multiple kinds of BOX source information 58 are registered in BOX source information memory 14a, the user may select one of the multiple kinds of BOX source information 58 in advance and set the selected BOX source information 58 as the default BOX source information 58. When only one kind of BOX source information 58 is registered in BOX source information memory 14a, CPU 11 may use the corresponding BOX source information 58 as the default BOX source information 58.

In Step S426, CPU 11 may determine whether any character string is redundantly included in the BOX source information 58 and the MFP source information 60 stored in source information memory 13b. In the search for any character string that is redundantly included, the MFP source information 60 may be searched from the beginning of the character string and the BOX source information 58 may be searched from the end of the character string in order to increase the processing speed. When the source information indicating the department to which a person belong is hierarchically described, e.g., the BOX source information 58 indicates "A company, development department" and the MFP source information 60 indicates "development department, Smith," any character string may likely be redundantly included at the beginning of the MFP source information 60 and the end of the BOX source information 58.

If CPU 11 determines that any redundant character string exists, e.g., YES at Step S426, CPU 11 may delete the redundant character string from the BOX source information 58 or the MFP source information 60 at Step S428. In Step S440, CPU 11 may add the MFP source information 60 to the end of the BOX source information 58 to generate the source information 54. The source information 54, e.g., "A company, development department, Smith," may be generated in which the redundant part, e.g., "development department," is deleted from the character string, e.g., "A company, development department, development department, Smith," resulted from adding the BOX source information 58 to the MFP source information 60.

If CPU 11 determines that no redundant character string exists, e.g., NO at Step S426, the process may skip Step S428, and CPU 11 may combine the BOX source information 58 and the MFP source information 60 to generate the source information 54 at Step S440, If BOX source information flag 13d is set to OFF, e.g., NO at Step S416, or if the BOX source information 58 is not registered, e.g., NO at Step S418, CPU 11 may generate the source information 54 without including the BOX source information 58, but including the MFP source information 60 based on the MFP source information 60 stored in source information memory 13b at Step S440.

If MFP source information flag 13c is set to OFF, e.g., NO at Step S410, or if the MFP source information 60 is not received, e.g., NO at Step S412, CPU 11 may determine whether BOX source information flag 13d is set to ON at Step S430. If BOX source information flag 13d is set to ON, e.g., YES at Step S430, CPU 11 may determine whether the BOX source information 58 is registered in BOX source information memory 14a at Step S432. If BOX source information 58 is registered in BOX source information memory 14a, e.g., YES at Step S432, CPU 11 may determine whether the management number specifying the BOX source information 58 is received from MFP 30 at Step S434.

If the determination in Step S434 is affirmative, e.g., YES at Step S434, CPU 11 may store the BOX source information 58 specified by the management number in source information memory 13b at Step S436. If, however, the determination in S434 is negative, e.g., NO at Step S434, CPU 11 may store the default BOX source information 58 in source information memory 13b at Step S438.

In Step S440, CPU 11 may generate the source information 54 without including the MFP source information 60 but including the BOX source information 58 based on the BOX source information 58 stored in source information memory 13b.

If CPU 11 determines that BOX source information flag 13d is set to OFF, e.g., NO at Step S430, or if CPU 11 determines that the BOX source information 58 is not registered, e.g., NO at Step S432, CPU 11 may not generate the source information 54, and the process may proceed to Step S441.

In Step S441, CPU 11 may generate the sending record 50 comprising one or more of the sending date and time information 52, the source information 54, and the page information 56. In Step S442, CPU 11 may add the generated sending record 50 to the header of the image data 62 and may facsimile transmit the image data 62 including the sending record 50 to the external apparatus 102 identified as the destination apparatus.

In the BOX-side FAX process, the BOX source information 58 selected by the user at the MFP 30 or the default BOX source information 58 may be included in the source information 54. Accordingly, the appropriate source information 54 may be generated.

By determining whether the BOX source information 58 exists and whether the MFP source information 60 exists, the source information 54 of three patterns, e.g., a first pattern of the source information 54 that includes both the BOX source information 58 and the MFP source information 60, a second pattern of the source information 54 that includes the BOX source information 58 without the MFP source information 60, and a third pattern of the source information 54 that includes the MFP source information 60 without the BOX source information 58, may be generated from the BOX source information 58 and the MFP source information 60. Thus, the steps to register these information by the user may be reduced.

For example, a user who has a business at home may switch the source information 54 to selectively transmit personal facsimile and business facsimile. The user may register the company name as the BOX source information 58 and may set the personal name as the MFP source information 60 to switch the source information 54 between the company name, the personal name, and the company name and the personal name.

The BOX source information 58 selected by the user in MFP 30, among the multiple kinds of BOX source information 58, may be included in the source information 54. In a second embodiment, the BOX source information 58 corresponding to the facsimile number of the destination apparatus, among the multiple kinds of BOX source information 58, may be included in the source information 54.

Figure 5A:
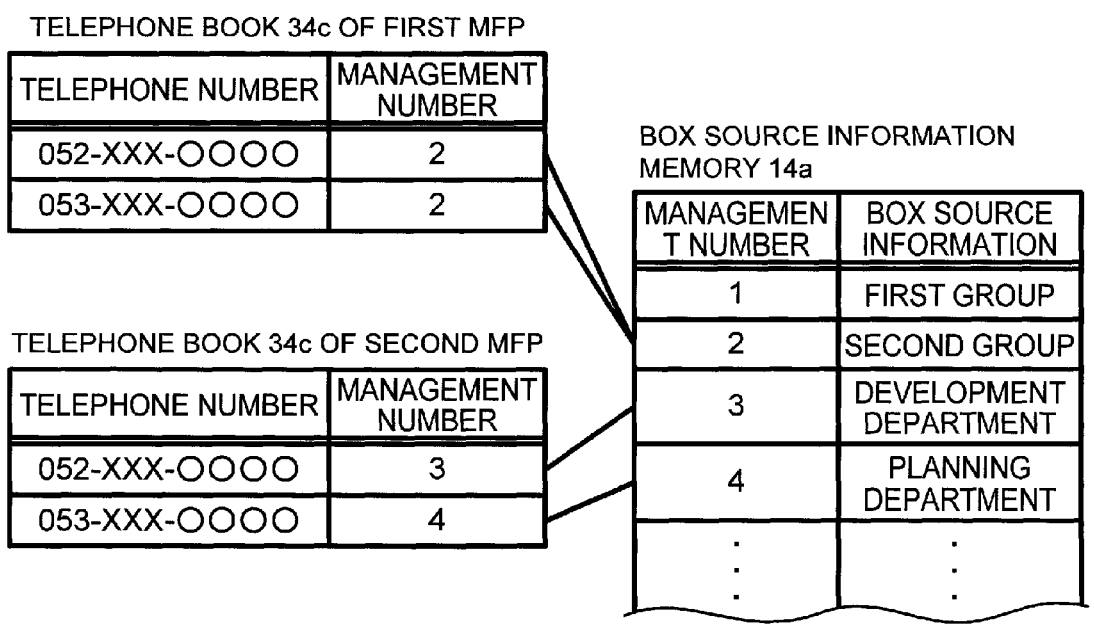
FIG. 5A schematically depicts the correspondence between a BOX source information memory provided in a BOX and digital telephone directory provided in an MFP according to a second embodiment of the invention.

FIG. 5A depicts the correspondence between BOX source information memory 14a provided in flash memory 14 in BOX 10 and digital telephone directory 34c provided in flash memory 34 in MFP 30 in communication system 1 according to the second embodiment of the invention. Digital telephone directory 34c may be provided in a first MFP 30 and digital telephone directory 34c may be provided in a second MFP 30, among the plurality of MFPs 30 included in communication system 1. As depicted in FIG. 5A, different pieces of information may be set in digital telephone directory 34c in the respective MFP 30.

The pieces of BOX source information 58 input by the user may be registered in BOX source information memory 14a and the management numbers for identification may be allocated to the registered pieces of BOX source information 58. The facsimile number of each destination apparatus input by the user of the MFP 30 may be registered in each digital telephone directory 34c.

MFP 30 may acquire the management numbers and the pieces of BOX source information 58 from BOX 10 and may display the management numbers and the pieces of BOX source information 58 that are acquired in LCD 40 in MFP 30. The user of MFP 30 may determine the BOX source information 58 to be associated with each facsimile number in each digital telephone directory 34c. The user may associate the management number of the BOX source information 58 with the facsimile number, and may set the facsimile number with which the management number of the BOX source information 58 is associated in digital telephone directory 34c.

Figure 5B:
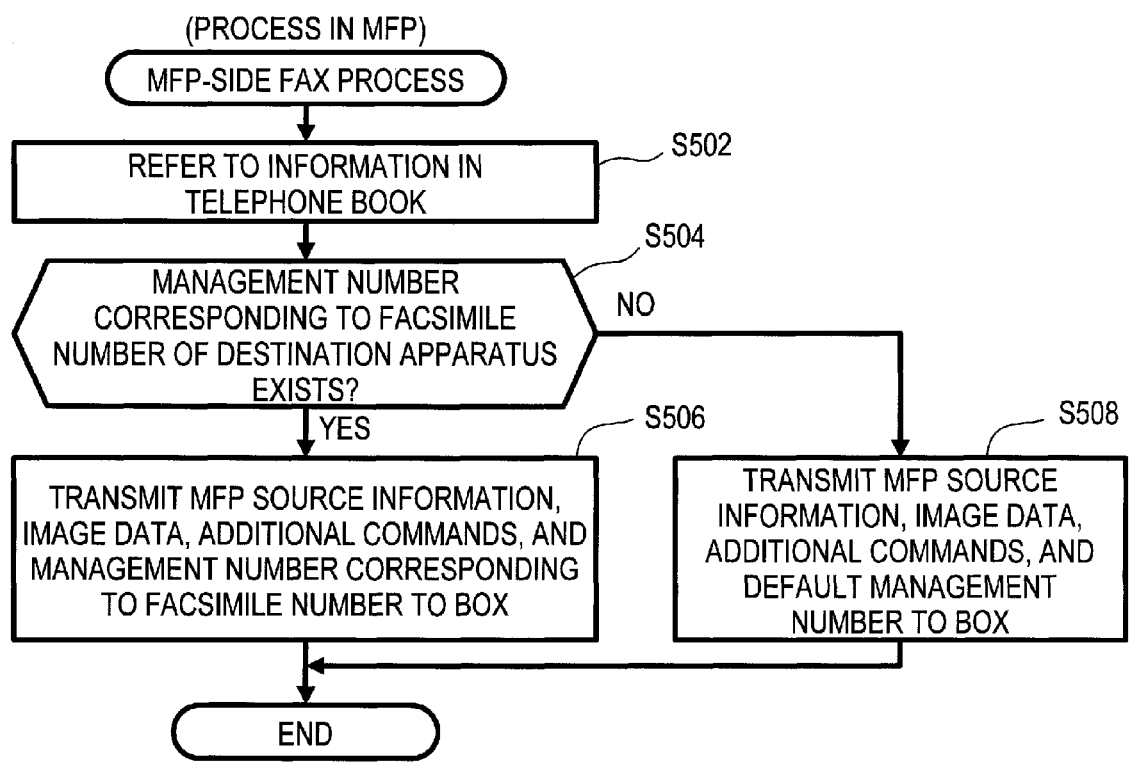
FIG. 5B is a flow chart depicting an MFP-side FAX process executed by a CPU in the MFP of the second embodiment of the invention.

FIG. 5B is a flow chart depicting an MFP-side FAX process executed by MFP 30 in communication system 1 according to the second embodiment of the invention. The image data 62 to be facsimile transmitted may be stored in image data memory 33a before the MFP-side FAX process depicted in FIG. 5B begins. The MFP 30 may notify BOX 10 of the facsimile number identifying the destination apparatus of the facsimile transmission.

Referring to FIG. 5B, CPU 31 may refer to digital telephone directory 34c at Step S502. In Step S504, CPU 31 may determine whether a management number is stored in digital telephone directory 34c in association with the facsimile number of the destination apparatus to which the image data is to be transmitted. If the determination in S504 is affirmative, e.g., YES at Step S504, CPU 31 may transmit the management number associated with the facsimile number of the destination apparatus to BOX 10, along with the MFP source information 60, the image data 62, and the additional commands, at Step S506.

If CPU 31 determines that the management number corresponding to the facsimile number of the destination apparatus, to which the image data is to be transmitted is not stored in digital telephone directory 34c, e.g., NO at Step S504, CPU 31 may transmit the default management number to BOX 10, along with the MFP source information 60, the image data 62, and the additional commands at Step S508. The default management number may be preset by the user for each MFP 30.

Thus, the source information 54 including the BOX source information 58 corresponding to the facsimile number of the destination apparatus may be generated in the MFP-side FAX process according to the second embodiment of the invention. If the management number corresponding to the facsimile number of the destination apparatus is not stored in digital telephone directory 34c, the appropriate source information 54 may be generated based on the preset default management number.

The correspondence between the facsimile number of the destination apparatus and the management number for each MFP 30 may be set. The combination of the destination apparatus and the source information 54 for each MFP 30 may be improved.

MFP 30 may be an example of the image processor. In another embodiment, the image processor may be various other apparatuses, including a mobile phone, a personal computer, a digital camera, and the like.

A plurality of MFP's 30 may be connected to one BOX 10 in communication system 1. In another embodiment, one MFP 30 may be connected to one BOX 10.

MFP 30 may notify BOX 10 of whether the sending date and time information 52 and the page information 56 are included in the sending record 50. MFP 30 may notify BOX 10 of the MFP source information 60 preset in MFP 30 in the MFP-side FAX processes. In another embodiment, the user may select the MFP source information 60 to be transmitted to BOX 10 in MFP 30 when multiple kinds of MFP source information 60 are preset in MFP 30.

MFP 30 may notify BOX 10 of the MFP source information 60 input by the user in MFP 30, instead of the preset MFP source information 60. Alternatively, MFP 30 may notify BOX 10 of a user name with which a user logs onto MFP 30 as the MFP source information 60.

The BOX source information 58 may be listed before the MFP source information 60 in the sending record 50. In another embodiment, the user may set the arrangement order of the BOX source information 58 and the MFP source information 60.

When multiple kinds of BOX source information 58 are registered in the BOX source information memory 14a, the user may select in advance one of the multiple kinds of BOX source information 58 as the default BOX source information 58. In another embodiment, the BOX source information 58 set for each MFP 30 may be selected as the default BOX source information 58. In this case, if MFP 30 does not notify BOX 10 of the management number, e.g., NO at Step S420 or NO at Step S434, the BOX source information 58 selected in advance for MFP 30, from which the facsimile transmission request is submitted, may be included in the source information 54 in BOX 10.

Digital telephone directory 34c in which the facsimile number of each destination apparatus may be associated with the management number provided in MFP 30. In another embodiment, digital telephone directory 34c may be provided in BOX 10. In this case, the facsimile number may be directly associated with the BOX source information.

The various functions may be performed by CPU 31 or CPU 11. In another embodiment, the various functions may be performed by another processor, e.g., an Application Specific Integrated Circuit ("ASIC"), or a logic circuit.

While the invention has been described connection with various exemplary structures and illustrative embodiments, it will be understood by those skilled in the art that other variations and modifications of the structures and the embodiments describes above may be made without departing from the scope of the invention. Other structures and embodiments will be apparent to those skilled in the art from the descriptions of the specification, including the accompanying figures, or from practice of the invention disclosed herein. It is intended that the specification and described examples are illustrative with the true scope of the invention being defined by the following claims.

What is claimed is:

1. A communication system comprising:
    a communication apparatus configured to communicate with a destination apparatus; and
    an image processor configured to connect to the communication apparatus,
    wherein the image processor comprises:
        a supplying unit configured to supply image data to the communication apparatus; and
        a notifying unit configured to transmit first additional information, comprising image processor source information that identifies the image processor, to the communication apparatus, and
    wherein the communication apparatus comprises:
        a memory configured to store second additional information comprising communication apparatus source information that identifies the communication apparatus;
        an information generator configured to generate third additional information based on the second additional information stored in the memory and the first additional information received from the image processor, the third additional information including the first additional information and the second additional information when an indication is received that the first additional information and the second additional information are to be included in the third additional information; and
        a transmitter configured to add the third additional information generated by the information generator to the image data supplied from the image processor and transmit the image data including the third additional information to the destination apparatus.

2. The communication system according to claim 1, wherein the image processor further comprises:
    a first instruction transmitter configured to transmit first instruction information to the communication apparatus, wherein the first instruction information indicates whether the second additional information is to be included in the third additional information, and
    wherein the information generator is configured to generate the third additional information including the first additional information without including the second additional information when the first instruction information transmitted from the first instruction transmitter indicates that the second additional information is not to be included in the third additional information.

3. The communication system according to claim 1, wherein the image processor further comprises:
    a second instruction transmitter configured to transmit second instruction information to the communication apparatus, wherein the second instruction information indicates whether the first additional information is to be included in the third additional information, and
    wherein the information generator is configured to generate the third additional information without including the first additional information when the second instruction information transmitted from the second instruction transmitter indicates that the first additional information is not to be included in the third additional information.

4. The communication system according to claim 1, wherein each of the first additional information and the second additional information indicates a source of the image data, and
    wherein the information generator is configured to arrange the second additional information and the first additional information in the third additional information, such that the second additional information is arranged before the first additional information in the third additional information.

5. The communication system according to claim 1, wherein the information generator is configured to arrange the first additional information and the second additional information in the third additional information, such that the first additional information and the second additional information are arranged successively in the third additional information.

6. The communication system according to claim 1, wherein the memory stores a plurality of types of second additional information, and
    wherein the information generator generates the third additional information comprising one type of second additional information selected from the plurality of types of second additional information in the third additional information.

7. The communication system according to claim 6, wherein the image processor further comprises:
    a specified information transmitter configured to transmit specified information for selecting one type of second additional information from the plurality of types of second additional information to the communication apparatus, and
    wherein the information generator includes the type of second additional information, which is selected based on the specified information transmitted from the specified information transmitter, in the third additional information.

8. The communication system according to claim 7,
wherein the image processor further comprises:
a specified information memory configured to store the specified information in association with identification information for identifying the destination apparatus, and
wherein the specified information transmitter of the image processor is configured to transmit the specified information stored in the specified information memory, which is associated with the identification information identifying the destination apparatus to which the image data is to be transmitted, to the communication apparatus.

9. The communication system according to claim 8,
wherein the specified information transmitter is configured to transmit predetermined specified information to the communication apparatus when the specified information, which corresponds to the identification information identifying the destination apparatus to which the image data is to be transmitted, is not stored in the specified information memory.

10. The communication system according to claim 7,
wherein the information generator generates the third additional information comprising predetermined second additional information when the specified information is not transmitted from the specified information transmitter.

11. The communication system according to claim 1,
wherein, when a redundant character string is included in a character string describing the first additional information and a character string describing the second additional information, the information generator is configured to generate the third additional information by combining the character string describing the first additional information with the character string describing the second additional information without the redundant character string.

12. A communication apparatus configured to communicate with a destination apparatus, the communication apparatus comprising:
an image data acquiring unit configured to acquire image data supplied from an image processor;
an additional information acquiring unit configured to acquire first additional information, comprising image processor source information that identifies the image processor, from the image processor;
a memory configured to store second additional information comprising communication apparatus source information that identifies the communication apparatus;
an information generator configured to generate third additional information based on the second additional information stored in the memory and the first additional information acquired by the additional information acquiring unit, the third additional information including the first additional information and the second additional information when an indication is received that the first additional information and the second additional information are to be included in the third additional information; and
a transmitter configured to add the third additional information generated by the information generator to the image data acquired by the image data acquiring unit and transmit the image data including the third additional information to the destination apparatus.

13. The communication apparatus according to claim 12,
wherein the communication apparatus is configured to receive first instruction information from the image processor indicating whether the second additional information is to be included in the third additional information, and
wherein the information generator generates the third additional information including the first additional information without including the second additional information when the first instruction information received from the image processor indicates that the second additional information is not to be included in the third additional information.

14. The communication apparatus according to claim 12,
wherein the communication apparatus is configured to receive second instruction information from the image processor indicating whether the first additional information is to be included in the third additional information, and
wherein the information generator generates the third additional information without including the first additional information when the second instruction information received from the image processor indicates that the first additional information is not to be included in the third additional information.

15. The communication apparatus according to claim 12,
wherein each of the first additional information and the second additional information indicates a source of the image data, and
wherein the information generator is configured to arrange the first additional information and the second additional information in the third additional information, such that the second additional information is arranged before the first additional information in the third additional information.

16. The communication apparatus according to claim 12,
wherein the information generator is configured to arrange the first additional information and the second additional information in the third additional information, such that the first additional information and the second additional information are arranged successively in the third additional information.

17. An image processor configured to connect to a communication apparatus that communicates with a destination apparatus, the image processor comprising:
a supplying unit configured to supply image data to the communication apparatus;
a notifying unit configured to transmit first additional information, comprising image processor source information that identifies the image processor, to the communication apparatus; and
a requesting unit configured to request the communication apparatus to:
add third additional information generated based on the first additional information transmitted from the image processor and second additional information, comprising communication apparatus source information that identifies the communication apparatus, stored in a memory of the communication apparatus to the image data, the third additional information including the first additional information and the second additional information when an indication is received that the first additional information and the second additional information are to be included in the third additional information, and
transmit the image data including the third additional information from the communication apparatus to the destination apparatus.

18. The image processor according to claim 17 further comprising:

a first instruction transmitter configured to transmit first instruction information to the communication apparatus, wherein the first instruction information indicates whether the second additional information is to be included in the third additional information.

19. The image processor according to claim 17 further comprising:
a second instruction transmitter configured to transmit second instruction information to the communication apparatus, wherein the second instruction information indicates whether the first additional information is to be included in the third additional information.

20. A communication system comprising:
a communication apparatus configured to communicate with a destination apparatus;
a first image processor configured to connect to the communication apparatus; and
a second image processor configured to connect to the communication apparatus,
wherein the first image processor comprises:
  a first supplying unit configured to supply image data to the communication apparatus; and
  a first notifying unit configured to transmit first additional information that identifies the first image processor to the communication apparatus,
wherein the second image processor comprises:
  a second supplying unit configured to supply image data to the communication apparatus; and
  a second notifying unit configured to transmit fourth additional information that identifies the second image processor, that is different from the first additional information, to the communication apparatus, and
wherein the communication apparatus comprises:
  a memory configured to store second additional information that identifies the communication apparatus;
  an information generator configured to generate third additional information,
  wherein the third additional information includes the second additional information stored in the memory and the first additional information received from the first image processor in response to receiving the first additional information from the first image processor,
  wherein the third additional information includes the second additional information stored in the memory and the fourth additional information received from the second image processor in response to receiving the fourth additional information from the second image processor; and
  a transmitter configured to add the third additional information generated by the information generator to the image data supplied from the image processor and transmit the image data including the third additional information to the destination apparatus.

21. The communication system according to claim 20,
wherein the second additional information includes a company name,
wherein the first additional information includes a department name, and
wherein the fourth additional information includes a department name that is different from the department name included in the first additional information.

22. The communication system according to claim 20,
wherein the second additional information includes a family name,
wherein the first additional information includes a personal name, and
wherein the fourth additional information includes a personal name that is different from the personal name included in the first additional information.

* * * * *